United States Patent
Yan et al.

(10) Patent No.: US 12,499,132 B2
(45) Date of Patent: Dec. 16, 2025

(54) MATCHING DATABASE RECORD IDENTITY THROUGH INTELLIGENT LABELING

(71) Applicant: AMPERITY, INC., Seattle, WA (US)

(72) Inventors: Yan Yan, Seattle, WA (US); Nicholas Resnick, Brooklyn, NY (US); Jean Ruggiero, Lake Forest Park, WA (US); Joseph Christianson, Seattle, WA (US)

(73) Assignee: AMPERITY, INC., Seattle, WA (US)

( * ) Notice: Subject to any disclaimer, the term of this patent is extended or adjusted under 35 U.S.C. 154(b) by 0 days.

(21) Appl. No.: 18/805,907

(22) Filed: Aug. 15, 2024

(65) Prior Publication Data

US 2025/0068653 A1 Feb. 27, 2025

Related U.S. Application Data

(60) Provisional application No. 63/578,329, filed on Aug. 23, 2023.

(51) Int. Cl.
*G06F 16/28* (2019.01)

(52) U.S. Cl.
CPC .................. *G06F 16/285* (2019.01)

(58) Field of Classification Search
CPC .................................................... G06F 16/285
See application file for complete search history.

(56) References Cited

U.S. PATENT DOCUMENTS

| | | | |
|---|---|---|---|
| 2015/0221045 A1* | 8/2015 | Heckler | G06Q 40/12 705/30 |
| 2018/0189667 A1* | 7/2018 | Tsou | G06N 5/01 |
| 2022/0245657 A1* | 8/2022 | Raghani | G06F 16/283 |
| 2024/0320492 A1* | 9/2024 | Liu | G06N 3/045 |
| 2024/0427775 A1* | 12/2024 | Wu | G06F 16/2456 |

\* cited by examiner

*Primary Examiner* — Jay A Morrison
(74) *Attorney, Agent, or Firm* — George Zalepa; Greenberg Traurig, LLP (57) ABSTRACT

The disclosed embodiments relate to devices, computer-readable media, and methods for generating training data for training an ordinal, regression-based classifier, the method including grouping client data based on client keys associated with the client data, pairwise matching records in the client data to generate feature signatures and inferring a label based on client key statuses for the pairwise-matched records, and building a training dataset from the inferred labels and feature signatures, the training dataset used to train the classifier.

20 Claims, 7 Drawing Sheets

MATCHING DATABASE RECORD IDENTITY THROUGH INTELLIGENT LABELING

CROSS-REFERENCE TO RELATED APPLICATIONS

This application claims the benefit of U.S. Prov. Appl. No. 63/578,329, filed Aug. 23, 2023 and incorporated herein by reference in its entirety.

This application is related to the following commonly-owned patents and applications:
- U.S. application Ser. No. 15/730,008, filed Oct. 11, 2017 (now U.S. Pat. No. 10,503,696)
- U.S. application Ser. No. 15/729,960, filed Oct. 11, 2017 (now U.S. Pat. No. 10,509,809)
- U.S. application Ser. No. 15/729,990, filed Oct. 11, 2017 (now U.S. Pat. No. 10,599,395)
- U.S. application Ser. No. 15/729,931, filed Oct. 11, 2017 (now U.S. Pat. No. 10,853,033)
- U.S. application Ser. No. 16/399,219, filed Apr. 30, 2019 (now U.S. Pat. No. 10,922,337)
- U.S. application Ser. No. 16/399,162, filed Apr. 30, 2019 (now U.S. Pat. No. 11,003,643)
- U.S. application Ser. No. 16/675,789, filed Nov. 6, 2019 (now U.S. Pat. No. 11,301,426)
- U.S. application Ser. No. 16/678,841, filed Nov. 8, 2019 (now U.S. Pat. No. 11,308,130)
- U.S. application Ser. No. 16/787,576, filed Feb. 11, 2020 (now U.S. Pat. No. 11,442,694)
- U.S. application Ser. No. 17/104,868, filed Nov. 25, 2020 (now U.S. Pat. No. 11,669,301)
- U.S. application Ser. No. 17/161,053, filed Jan. 28, 2021
- U.S. application Ser. No. 17/316,293, filed May 10, 2021
- U.S. application Ser. No. 17/715,204, filed Apr. 7, 2022 (now U.S. Pat. No. 11,797,487)
- U.S. application Ser. No. 17/715,325, filed Apr. 7, 2022
- U.S. application Ser. No. 17/930,915, filed Sep. 9, 2022 (now U.S. Pat. No. 11,972,228)

All of the foregoing applications are incorporated by reference in their entirety.

BACKGROUND

Many computer systems store data related to users or other entities. In some systems, this data can be in the form of database records or entries. In such systems, data can be entered through various means which can result in a single entity (e.g., user, business, etc.) being associated with multiple digital records. Without matching such duplicate records, these systems are inherently inaccurate as they often over count the true number of entities.

There is thus a need for automated methods to generate high-quality training data for entity matching systems. Such methods should be scalable, adaptable to different data types and domains, and capable of producing training datasets that lead to robust and accurate entity matching models. Additionally, these methods should be able to leverage existing data structures and identifiers within organizations to minimize the need for additional manual input.

DETAILED DESCRIPTION

Entity matching, also known as record linkage or identity resolution, is a critical process in data management and analytics. It involves identifying and linking different records that refer to the same real-world entity across various datasets or within a single dataset. This process is central to maintain data quality, enable accurate analysis, and provide a unified view of entities in a system.

Traditional approaches to entity matching often rely on rule-based systems or manual review processes. These methods can be time-consuming, error-prone, and difficult to scale as data volumes grow. More advanced techniques involve machine learning models, but these typically require large amounts of labeled training data to perform effectively.

One of the key challenges in developing effective entity matching systems is the creation of high-quality training datasets. This process is often labor-intensive, requiring manual labeling of pairs of records as matches or non-matches. The manual labeling process is not only time-consuming but also prone to inconsistencies and errors, especially when dealing with large-scale datasets. Furthermore, the dynamic nature of real-world data means that entity matching models need to be regularly updated to maintain their accuracy. This necessitates a continuous supply of fresh, accurately labeled training data, which can be prohibitively expensive and time-consuming to generate through traditional manual methods.

One implementation for matching entities involves the use of an ordinal, regression-based classifier. However, one technical problem for many models (especially entity matching models) is the lack of ground truth data to train such models. The disclosed embodiments solve these and other problems in the field of automatic training data synthesizing for machine learning model training.

In some implementations, the disclosed embodiments operate on a large corpus of entity data. In some implementations, this entity data comprises entity records and internal identifiers provided by individual data sources. For example, a client or business may have their own internal identifiers (e.g., client loyalty numbers, GUIDs, etc.) that they use for their own operations. Certainly, different organizations have their own internal identifier formats and types. Such organizations may provide these internal identifiers to the disclosed embodiments to aid in performing entity matching, as will be discussed.

The disclosed embodiments provide a framework designed to fully leverage such pre-labeled and internal identifiers in a collaborative way. Differing from manually acquired labels which can be limited in size in practice and where a small number of incorrect or inconsistent labels could bias the results, the disclosed embodiments embrace the principles (from information theory) of uncertainty and inconsistency themselves are a form of information.

The disclosed embodiments determine the match level based on degrees of uncertainty or inconsistency found within and among each set of pre-labeled identifiers (e.g., set of client keys). The described approach creates a synergistic alignment with an ordinal-regression-based classifier and hierarchical clustering routine as described in the previously described patent publications.

The disclosed embodiments thus do not attempt to eliminate conflicting information. Instead, the disclosed embodiments employ innovative methods to extract value from each piece of data, including those that initially appear ambiguous or uncertain. Details of this approach are provided herein.

Figure 1:
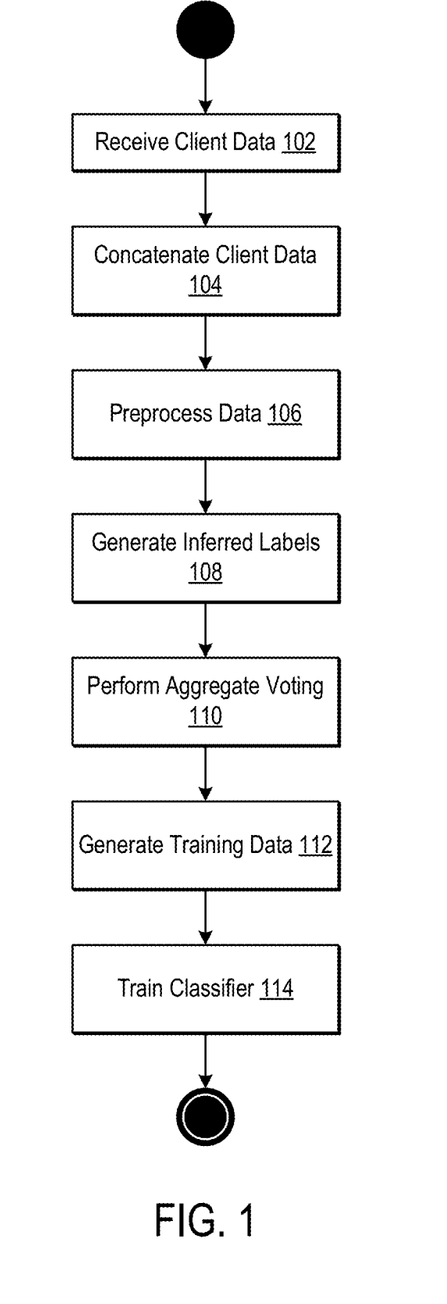
FIG. 1 is a flow diagram illustrating a method for building a training dataset and training a classifier according to some of the disclosed embodiments.

FIG. 1 is a flow diagram illustrating a method for building a training dataset and training a classifier according to some of the disclosed embodiments.

In step 102, the method can include receiving a set of client-provided data from, for example, a client data store.

In some implementations, the client-provided data can include records that include a client key (CK). In some implementations, the CK can comprise any type of internal identifier used by the client in its operations. Examples include, but are not limited to, loyalty card numbers, frequent flier numbers, globally internal identifiers (GUIDs), or similar values. Generally, such identifiers are strong evidence (but not conclusive or exhaustive) of unique identifies given that clients rely on them to make decisions or invoice clients. As such, a major failure in identifying clients would be detrimental to the client, thus providing a strong basis for treating client keys as useful information. Although one client is described, the method can (and does) operate on multiple clients simultaneously, as will be illustrated below.

In step 104, after receiving a data set, the method can then concatenate client data together.

In some implementations, this step can further include grouping the records by client keys. In some implementations, the step can generate a table or view of records as illustrated in the following example:

TABLE 1

| CK | PK | First Name | Last Name | Birthdate | Email |
|---|---|---|---|---|---|
| A-111 | r-1 | Katelyn | Ward | null | kward1970@example.com |
| A-111 | r-2 | Kate | Ward | Oct. 28, 1970 | kward1970@example.com |
| A-111 | r-3 | K | Ward | Oct. 28, 1970 | null |
| A-112 | r-4 | Greg | Hamilton | Feb. 4, 1985 | greg@example.com |
| A-112 | r-5 | Greg | Hamilton | Feb. 4, 1985 | ghamilton@example.com |
| A-223 | r-6 | Kate | Schmidt | null | null |
| null | r-7 | John | Smith | Mar. 6, 1969 | null |
| null | r-8 | Greg | null | null | hellogreg@example.com |

In Table 1, CK may represent a client-supplied internal identifier, PK can comprise a generated (e.g., auto-incrementing or similar) internal identifier (i.e., an identifier uniquely identifying each row in the table), "First Name" and "Last Name" may represent first and last names of the user, respectively, "Birthdate" may represent a user's birthday, and "Email" may represent a user-supplied email. In some implementations, when a value is not present, a null value can be listed, although other methods of handling empty data can be used.

As illustrated in Table 1, there is a strong (but not complete or absolutely certain) correlation between CK and unique entities. For example, CK A-111 is associated with various permutations of the user "Katelyn Ward," CK A-112 is associated with various permutations of the user "Greg Hamilton," and CK A-223 is associated with various permutations of the user "Kate Schmidt."

As will be discussed next, the following steps describe a computerized process for exploiting this correlation across large-scale data clusters. It should be noted that while the examples are provided for the sake of readability, the method can be deployed in large scale settings where human processing of such data is practically impossible given the potential for billions or trillions of records. Further, as will be discussed, the pairing of records can quadratically increase the data size such that no human process can handle the volume of data.

In step 106, after generating the above data, the method can then prepare the data by pre-processing, blocking, and generating pairwise features for the records and storing the results. Details of this process are described in commonly-owned patents and applications listed above which are not described herein but are incorporated by reference in their entirety. In general, the data may be filtered and cleaned using standard techniques. Next, pairs of records are compared with each other to generate feature signatures that represent the similarity of each pair, as described in the commonly-owned patents and applications. Next, entity pairs that cannot be correlated are blocked from further processing, substantially reducing the data set. Finally, each pairwise combination of records is analyzed to generate a feature signature that represents their relationship.

In step 108, the method can generate an inferred label and value based on the corresponding CK.

For ease of discussion, the following twelve example binary features are considered as part of the foregoing steps. Each feature is a binary value representing the described result of a comparison between two records in a pair.

1 first-name-exact-match: the two records have the same first name
2 first-name-approx-match: the two records have a fairly similar first name
3 first-name-non-conflicting: the two records have non-conflicting first names
4 last-name-exact-match: the two records have the same last name
5 last-name-approx-match: the two records have a fairly similar last name
6 last-name-non-conflicting: the two records have non-conflicting last names
7 birthdate-exact-match: the two records have the same birthday
8 birthdate-approx-match: the two records have a fairly similar birthday
9 birthdate-non-conflicting: the two records have non-conflicting birthday
10 email-exact-match: the two records have the same email
11 email-approx-match: the two records have a fairly similar email
12 email-non-conflicting: the two records have non-conflicting email The foregoing examples provide a label (e.g., "first-name-exact-match") and explanation (e.g., "the two records have the same first name").

In some implementations, features can be grouped into tuples. For example, the foregoing twelve features may be grouped into four three-bit. In some implementations, a given tuple contains exactly a single one value or all zero values.

In some implementations, each binary value is combined to form a binary feature signature. An example is provided now with records r-1 and r-2 in Table 1. Here, the figure signature can be generated as [010 100 001 100] which is explained as follows:

1 Kate and Katelyn are not exact matches: 0
2 Kate and Katelyn are approximate matches: 1
3 Given feature 2 matches: 0
4 The last names are identical: 1
5 Given feature 4 matches: 0
6 Given feature 4 matches: 0
7 Birthdays are not identical: 0
8 Birthdays are not similar (since one is null): 0
9 Birthdays are not conflicting (since one is null): 1
10 Emails are the same: 1
11 Given feature 10 matches: 0
12 Given feature 10 matches: 0

This process can be repeated for all pairs of records and is illustrated in the following table:

TABLE 2

| Record Pair | Feature Signature | Inferred Label | Label Value |
|---|---|---|---|
| (r-1, r-2) | [010 100 001 100] | match | 1 |
| (r-1, r-3) | [010 100 001 001] | match | 1 |
| (r-2, r-3) | [010 100 100 001] | match | 1 |
| (r-4, r-5) | [100 100 100 010] | match | 1 |
| (r-2, r-6) | [100 010 001 001] | non-match | 0 |
| (r-4, r-8) | [100 001 001 010] | unknown | null |
| (r-5, r-8) | [100 001 001 010] | unknown | null |

As discussed, the specific number of features is not limiting. In this example, the number of record pairs includes seven pairs. As discussed, this reduced set (seven versus twenty-eight pairs) can be accomplished by blocking obvious non-matches. In some implementations, the feature signature column can be computed by performing the comparisons described above for each desired feature.

As part of step 108, the "inferred label" and "label value" can be determined based on the CK for each record in a record pair. If both records in the pair have the same CK, the inferred label is set as "match" and the label value set to one. For example, r-1 and r-2 both have a CK of A-111 and thus are set as a "match" (value of one). By contrast, if the records have conflicting client keys, the inferred label is set as "non-match" and the value set to zero. For example, r-2 and r-3 have different client keys. If any record has a null CK, the inferred label can be set to "unknown," and the label value is set to null. For example, r-8 does not have a CK and thus the pairs (r-4, r-8) and (r-5, r-8) are set accordingly. The specific values are not necessarily limiting. However, the general principle applies that when a CK is associated with two records it is strong evidence of a match. If the client keys differ it is strong evidence of a non-match. Otherwise, there is no evidence either way of a match or non-match.

In some implementations, step 108 is described with respect to a single client. However, in a multi-tenanted system, this process can be repeated for all clients. Since only primary keys, feature signatures, inferred labels, and label values are output as part of this step, client privacy can be ensured.

In step 110, after analyzing all pairs, the method can then perform aggregating voting on each feature signature across clients.

As part of step 110, the method can compute the match likelihood of a given feature signature across multiple client datasets. This is illustrated, via example, in the following table:

TABLE 3

| Feature Signature | Client 1 Match | Client 2 Match | ... | Client N Match | Average Match | Match Level |
|---|---|---|---|---|---|---|
| [010 100 001 100] | 99% | 98% | ... | 95% | 95% | strong match |
| [010 100 001 001] | 80% | 85% | ... |  | 90% | moderate-match |
| [010 100 100 001] | 82% | 90% | ... | 80% | 82% | moderate-match |
| [100 100 100 010] | 60% |  | ... | 68% | 61% | weak-match |
| [100 010 001 001] | 62% | 45% | ... | 55% | 59% | weak-match |
| [100 001 001 010] | 40% | 46% | ... | 70% | 49% | weak-match |

In some implementations, the method can select each unique feature signature. Then, for each client, the method can compute how many matches were identified based on the corresponding record pairs and associated feature signature (e.g., the "Client 1" match rate) in Table 1. As discussed, this match rate can be driven by the CK of a given client and thus each client's match rate for a given signature may vary (as illustrated in the final row comparing Client 1 and Client N, which have different match rates). Finally, each client's match rate can then be aggregated (e.g., averaged) to form the "averaged match rate" for a feature signature. Finally, a "match level" label can be assigned to the numerical averaged match rate based on a thresholding operation applied to the continuous percentage (e.g., over 90% is a "strong match," between 80% and 90% is a "moderate-match," and under 80% is a "weak-match"). In some implementations, the threshold levels may be adjusted as needed or preferred.

To further illustrate the above example, the method may select feature signature [010 100 001 100]. It may then query a first client (Client 1) to identify (using a table such as that in Table 2) all record pairs having the signature [010 100 001 100]. It may then compute how many records have that signature (n) and how many are matches (m) and compute the Client 1 match rate as m/n (e.g., "99%"). This process can then be repeated for each combination of feature signature and client and then the aggregation is performed, and thresholding is applied to obtain Table 3.

Generally speaking, consistently high match rates may warrant a strong-match label, moderate disagreements may warrant a moderate-match label, and larger disagreements may lead to a weak-match label. In some implementations, the method can use an averaged match rate across all client systems to decide the thresholds. However, in some implementations, the varied quality of CK systems may impact the effectiveness of such an approach. Thus, in other implementations, the method can assign weights to the client keys based on their reliability (or consistency).

In some implementations, these weights can be computed as:

$$W_j = 1 - \sum_{i=1}^{K} \frac{H(X_i)}{K}$$ Equation 1

In Equation 1, $H(X_i)$ is the entropy for a given feature-signature i, and $$\sum_{i=1}^{K} \frac{H(X_i)}{K}$$

is the mean of entropies for all the feature signatures. In general, higher entropy may correlate with greater uncertainty, so the method can assign lower weights to client systems with high entropy. In some implementations, this entropy analysis can also help in identifying areas for improvement. For example, if certain feature signatures consistently show high entropy across all client systems, it indicates the necessity for additional features or more detailed granularity, pointing to an opportunity for further feature engineering. Table 4 below illustrates an example of how one may utilize this weighting:

TABLE 3

| Feature Signature | CK-1 Entropy | CK-2 Entropy | ... | CK-M Entropy | FS Entropy Mean | Indication |
|---|---|---|---|---|---|---|
| FS-1 | 0.1 | 0.1 | ... | 0.2 | 0.13 | Good |
| FS-2 | 0.4 | 0.3 | ... | 0.5 | 0.45 | Too uncertain[††] |
| ... | ... | ... | ... | ... | ... | ... |
| FS-K | 0.2 | 0.1 | ... | 0.3 | 0.2 | Good |
| CK Entropy Mean | 0.2 | 0.15 | ... | 0.4 | ... | ... |
| Indication | Good | Good | ... | Too uncertain[†] | ... | ... |

As illustrated, the mean CK entropy for CK-1 and CK-2 are low and labeled as "good" client keys. However, the value (daggered, "Too uncertain") of CK-M exceeds a preconfigured triggering threshold and is thus labeled as too uncertain. In some implementations, the method may drop this CK when performing the foregoing method and/or continuing processing described herein. Similarly, the method can compute and average entropy across client keys for a given signature. Here, FS-1 and FS-K may be suitable for use in training given the low mean entropy. However, FS-2 has a mean entropy exceeding a second preconfigured threshold which means that the value is too uncertain. In some implementations, this indicator (double-daggered) may indicate that a hidden feature is present that merits further feature engineering.

In step 112, after performing the foregoing analysis, the method can generate a training data set and store this data in example database using the remaining feature signatures and the match level and, in some implementations, the match rate. In some implementations, the feature signature comprises a training example and the match label and/or match level can comprise a label.

In step 114, using this training data, the method can then train a classifier such as an ordinal, regression-based classifier as described in other commonly-owned applications cited above.

Figure 2:
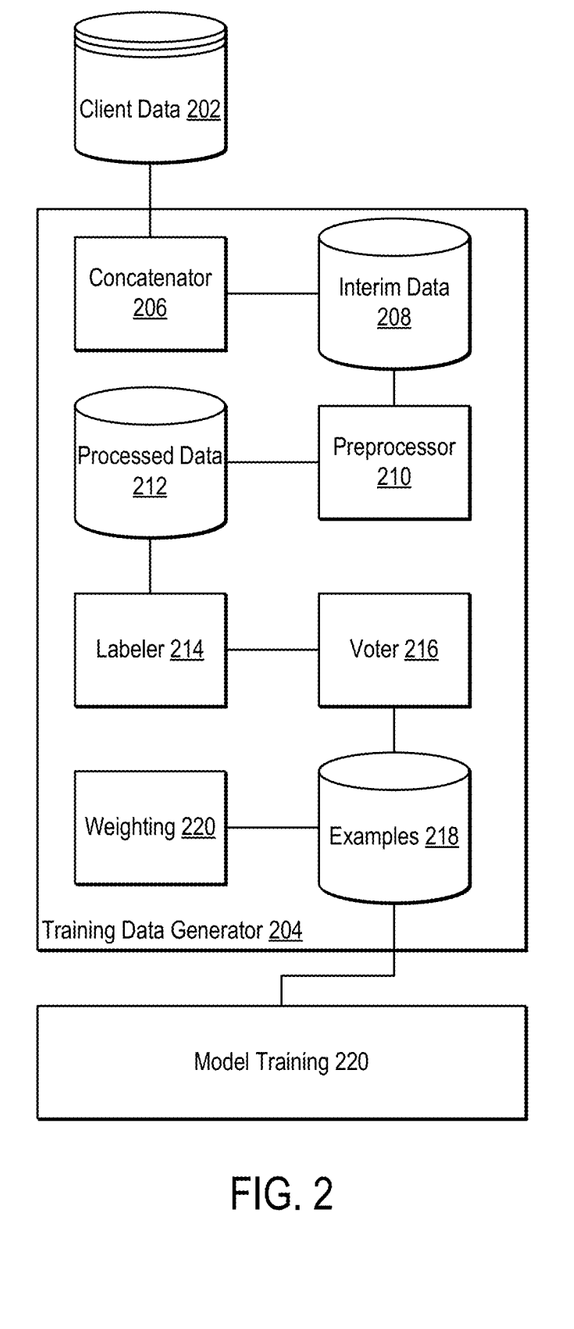
FIG. 2 is a block diagram of a system for generating training data and training a classifier according to some of the example embodiments.

FIG. 2 is a block diagram of a system for generating training data and training a classifier according to some of the example embodiments.

The illustrated system includes a client data store 202 which stores client-provided data. The client data store 202 may comprise a raw data storage device or set of devices (e.g., distributed database). The specific storage technologies used to implement client data store 202 are not limiting. As one example, the client data store 202 can store data related to client records for one or more clients, including client keys (CKs) and associated personally identifiable information (PII) such as names, birthdates, and email addresses. The client data store 202 may contain data from multiple clients, each with their own unique identifier systems and data structures.

A training data generator 204 is communicatively coupled to client data store 202 and reads data from client data store 202. The training data generator 204 includes several components that perform the steps of generating training data for a classifier. These components work in concert to transform raw client data into a structured, labeled dataset suitable for training an entity matching classifier.

A concatenator 206 is communicatively coupled to the training data generator 204 and receives client data from the client data store 202. The concatenator 206 combines and groups the client data, particularly grouping records by their associated client keys. This grouping process is crucial for identifying potential matches and non-matches in subsequent steps. The concatenator 206 outputs the grouped data to an interim database 208. The interim database 208 serves as a temporary storage for the grouped data, allowing for efficient access by subsequent components in the pipeline.

A preprocessor 210 is communicatively coupled to the interim database 208 and reads the grouped data. The preprocessor 210 performs several critical data preparation tasks. First, it conducts pre-processing operations such as data cleaning and standardization. Next, it implements blocking strategies to reduce the number of pairwise comparisons needed in later stages. Finally, it generates pairwise features for the records, creating feature signatures that represent the similarity between pairs of records. These feature signatures are fundamental to the entity matching process. The preprocessor 210 outputs the processed data, including the generated feature signatures, to a processed data store 212.

A labeler 214 is communicatively coupled to the processed data store 212 and reads the processed data. The labeler 214 generates inferred labels and values based on the corresponding client keys for each pair of records. This labeling process is a key innovation of the system, as it automates the creation of training labels without manual intervention. The labeler 214 assigns "match," "non-match," or "unknown" labels to record pairs based on their client key relationships. The labeler 214 outputs the labeled data to a voter 216.

The voter 216 performs aggregating voting on each feature signature across clients. This component is critical for handling multi-client scenarios and reconciling potential discrepancies between different client key systems. The voter 216 computes match likelihoods for given feature signatures across multiple client datasets and assigns match levels (e.g., "strong match," "moderate match," "weak match") based on these likelihoods. This voting process helps to create a consensus view of matching likelihood across diverse datasets. The voter 216 outputs the voting results to an example database 218.

A weighting component 220 is communicatively coupled to the voter 216 and applies weights to the client keys based on their reliability. The weighting component 220 computes entropy-based weights for each client key system, providing a measure of the information content and consistency of each system. These weights are used for handling varying quality levels among different client key systems. The weighting component 220 provides these weights to the voter 216 to refine the voting process, ensuring that more reliable client key systems have a stronger influence on the final labels.

An example database 218 stores the results of the voting process, including feature signatures, match levels, and potentially match rates. This database serves as the repository for the generated training data, bridging the gap between the data generation process and the model training phase.

A model training component 222 is communicatively coupled to the example database 218 and uses the generated training data to train a classifier, such as an ordinal, regression-based classifier. This component represents the final stage of the process, where the automatically generated and labeled training data is used to create a machine learning model capable of performing entity matching on new, unseen data.

In operation, client data flows from the client data store 202 through the various components of the training data generator 204, being transformed at each stage. The concatenator 206 groups the data, providing a structured foundation for analysis. The preprocessor 210 then prepares this data and generates features, creating the feature signatures that form the basis of the matching process. The labeler 214 infers labels for record pairs, automating a process that would traditionally require manual effort. The voter 216, aided by the weighting component 220, aggregates and refines these labels across multiple clients, creating a robust consensus. The resulting training data, stored in the example database 218, is then used by the model training component 222 to train the final classifier.

This system provides an automated, scalable method for generating high-quality training data for entity matching classifiers, leveraging client keys and feature signatures across multiple client datasets. By automating this process, the system enables more frequent and consistent updating of entity matching models, potentially improving their accuracy and adaptability to changing data patterns. The system's ability to handle multiple clients and weight the reliability of different client key systems makes it particularly suitable for large-scale, multi-tenant environments where data quality and consistency may vary.

The foregoing embodiments increase the reliability and effectiveness of a machine learning classifier due to the underlying training data generation process, providing numerous benefits. First, the embodiments improve automated model retraining. Specifically, the acquisition and refreshing of labels can be fully automated, largely removing the need for human intervention. As a result, model refresh can also be automated. Second, the embodiments improve feature incorporation. Specifically, the integration of new features becomes not only possible but can be automated as well. Third, the embodiments improve results explainability. Specifically, the process of presenting and explaining results to clients becomes easier because every score now has strong statistical backing. Fourth, the embodiments can be utilized to build client-specific models. Specifically, by allocating a strong weight to a given client's client key, we can offer clients customized models with a simple tweak. Fifth, the embodiments enable vertical or region-specific models. Specifically, the ability to build models customized for a given vertical (e.g., retails or airline) or geographical region (e.g., Europe or Japan) is possible. Overall, the embodiments significantly boost adaptability and precision of machine learning models.

Figure 3:
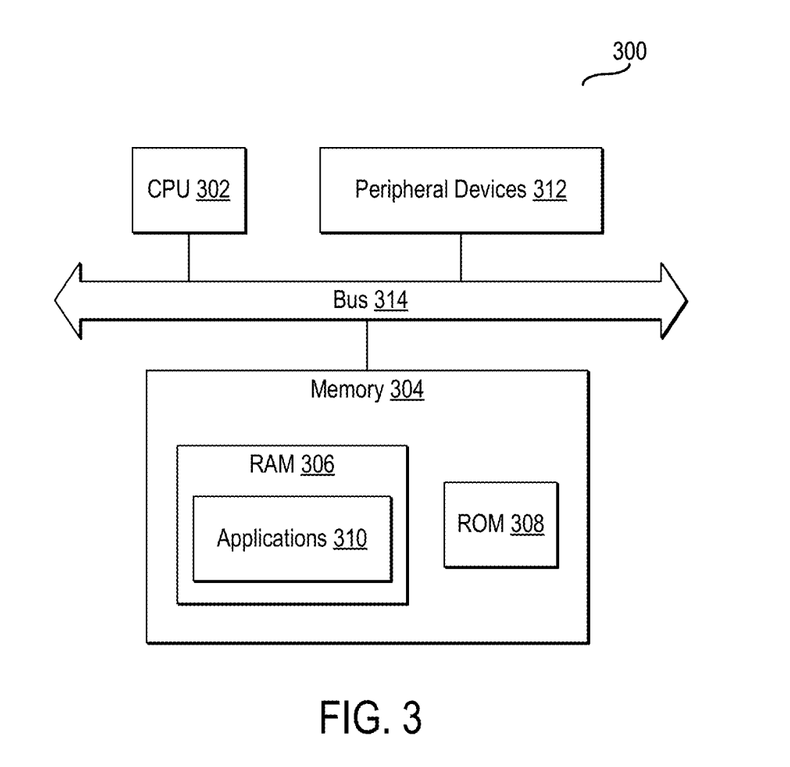
FIG. 3 is a flow diagram illustrating an improved sampling method for generating training data for an entity matching classifier according to some embodiments of the disclosure.

FIG. 3 is a flow diagram illustrating an improved sampling method for generating training data for an entity matching classifier according to some embodiments of the disclosure.

In step 302, the method can include initiating a sampling process. In some implementations, the method can start when a new dataset is received, when there's a need to update the existing training data, or when the entity matching model requires retraining. It may also be triggered periodically as part of a scheduled model maintenance routine, or when new types of data or client keys are introduced to the system. The sampling process ensures that the training data remains current and representative of the evolving dataset, allowing the entity matching model to adapt to changing patterns and maintain its accuracy over time. In some implementations, the method of FIG. 3 can be performed prior to the method of FIG. 1. The illustrated sampling process addresses the technical challenge of creating a representative and balanced dataset for training the entity matching classifier, which improves the overall performance of the system.

In step 304, the method checks if a CK match is available. In some implementations, this step can utilize client system CKs to guide the sampling process. For example, CKs, such as loyalty program numbers or frequent flyer IDs, are considered strong evidence of unique identities, although not infallible. Thus, in this step the method can re-purpose client CK system matches.

If a CK match is available, the method proceeds to step 306, where it samples records with matching CKs. In some implementations, this sampling can be performed by first identifying all records that share the same CK value. From this group, the method can select a subset of records to use as positive examples in the training set. The selection can be random or stratified to ensure representation of different types of matches. For example, if there are 100 records with the same CK, the method might randomly select 10 pairs to include in the training set. In some implementations, this approach focuses on pairs of records that are likely to represent the same entity, based on the shared CK provided by a client system. By prioritizing these matches, the method ensures that the training set includes a substantial number of positive examples since there is an underlying assumption that a client's CK system is likely relatively accurate.

If no CK match is available, the method proceeds to step 308, where it employs an alternative sampling method. This step ensures that the sampling process can continue even in the absence of CK matches, maintaining the diversity of the training set.

Following the sampling of CK matches, the method proceeds to step 310, where it creates artificial non-matches. As used herein, an artificial non-match means a computer-generated record pair that is known to be a mismatch of users or clients. Generally, the method can identify how many records from a client's raw data have had a CK match and the method can synthesize an equal number of "mismatches" to balance the dataset. In some implementations, the method can perform this step by taking records from different CK matches and pairing them together, ensuring that these artificial pairs have non-matching CKs. As a result, after step 310, the method balances the training set, providing an equal (or close to equal) number of positive (matching) and negative (non-matching) examples.

In step 312, the method can include checking the "density" of each record pair. Density in this context refers to the amount of comparable information shared between two records; a high-density pair would have multiple matching or similar fields (such as name, address, email, etc.), providing more points of comparison and thus more informative for the matching process. In some implementations, this density check acts as a filter to ensure the quality of the sampled pairs. Specifically, this step the method can identify a CK system where when the method find CK matches, those pairs are dense overall with user data. Thus, this step helps to identify pairs that have a sufficient amount of comparable information.

If the pair density is high, the method can include keeping the pair at step 314. In some implementations, high-density pairs are more informative for the training process, as they provide more points of comparison between the records. By contrast, if the pair density is low, the method discards the pair at step 316. In some implementations, low-density pairs may not provide enough information for meaningful comparison and could potentially introduce noise into the training set.

For pairs that pass the density check, the method proceeds to step 318, where it checks the similarity between the records in the pair. This can be accomplished by calculating a similarity score using techniques such as Jaccard similarity for categorical fields, edit distance for string fields, and normalized numerical differences for numeric fields. The method then compares this similarity score against predefined upper and lower thresholds. If the score falls between these thresholds, the pair is considered appropriately similar. Pairs with scores above the upper threshold are considered too similar (potentially trivial duplicates), while those below the lower threshold are deemed too dissimilar. Only pairs within the desired similarity range are retained for the training dataset, ensuring a balanced representation of informative record pairs.

If the pair is too similar or too dissimilar, the method can include discarding it in step 320. In some implementations, pairs that are too similar may represent trivial duplicates, which may not add value to the training set. Conversely, pairs that are too dissimilar may likewise not provide useful information for the matching process.

If, on the other hand, the similarity is appropriate (as discussed above), the method can include adding the pair a training data set at step 322. In some implementations, these pairs represent the ideal (or nearly ideal) candidates for training the entity matching classifier described above, as they provide meaningful comparisons that can help the model learn to distinguish between matching and non-matching entities.

After processing a pair, the method can include selecting the next pair in step 324. This ensures that all sampled pairs are evaluated through the density and similarity checks. In step 326, the method can include checking if there are more pairs to process. If so, the method can return to the density check at step 312, continuing the evaluation of sampled pairs. If there are no more pairs to process, the method can terminate.

This improved sampling method addresses several technical challenges in creating training data for entity matching classifiers. First, it leverages client keys to identify likely matches, providing a strong foundation for positive examples. Second, it creates artificial non-matches, ensuring a balanced dataset with both positive and negative examples. Third, it implements density and similarity checks to filter the pairs, focusing on those that are most informative for the training process. The resulting method can be used to generate a smooth distribution of record pairs as well as a smaller and more focused training set for performance reasons and thus improving the computational performance of training as well as model performance. By carefully selecting and filtering record pairs, the method can create a high-quality, balanced, and informative training dataset. This dataset can be used to train an effective entity matching classifier, capable of accurately identifying matching entities across diverse datasets. Furthermore, the entire method discussed above can critically be performed autonomously and without human labeling. Thus, the method can be re-executed at will to continuously improve a training data set. Thus, the improved sampling method represents a significant advancement over traditional approaches, addressing the unique challenges of entity matching in large-scale, multi-tenant environments. By automating the creation of a robust training dataset, it enables more frequent and consistent updating of entity matching models, potentially improving their accuracy and adaptability to changing data patterns.

Figure 4:
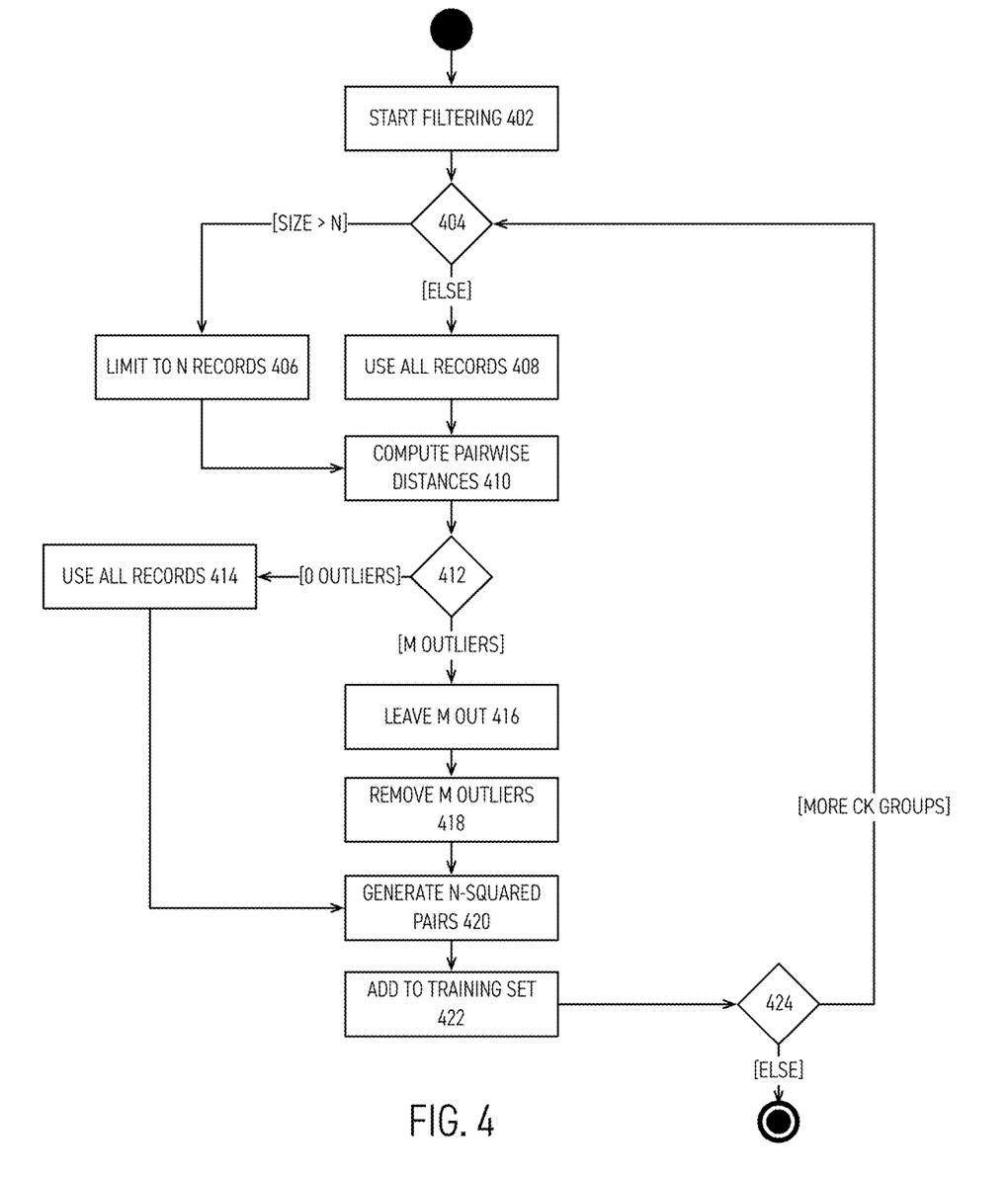
FIG. 4 is a flow diagram illustrating a filtering method for handling shared client keys in the process of generating training data for an entity matching classifier according to some embodiments of the disclosure.

FIG. 4 is a flow diagram illustrating a filtering method for handling shared client keys in the process of generating training data for an entity matching classifier according to some embodiments of the disclosure.

In step 402, the method can start filtering.

In some implementations, the filtering method can be initiated after the initial sampling of record pairs and before the final compilation of the training dataset. In some implementations, it may be triggered automatically as part of the data preparation pipeline, especially when dealing with new or updated datasets that contain client keys. In some implementations, the filtering method can also be started when there's a need to refine the quality of the training data, particularly in scenarios where over-clustering due to shared client keys is suspected. Additionally, this step might be initiated periodically as part of a data quality assurance process to ensure the ongoing integrity and representativeness of the training dataset. In some implementations, the filtering method described herein addresses a significant technical challenge in using CKs for entity matching: the tendency of CKs to over-cluster, particularly in cases where CKs might be shared within households or among related individuals.

In step 404, the method checks the size of a selected CK group. In this step, the method can manage the computational complexity of the subsequent steps. Specifically, in some implementations, a threshold may be set on which to trigger or forego filtering. For example, the method may not want to waste resources checking CKs that have one thousand records with the same CK so thus may limit the process to those groups having a fixed size or less (e.g., ten, used herein as a non-limiting example).

If the CK group size is greater than the threshold (e.g., 10), the method can proceed to step 406, where it limits the group to a number of records equal to the threshold. In some implementations, this limitation helps to keep the computational requirements manageable while still providing a sufficient sample for analysis.

If the CK group size is the threshold or fewer, the method moves to step 408, where all records in the group are used as the size is below the threshold. This ensures that smaller CK groups are fully analyzed without any data loss. For example, the method might use a stratified sampling approach, selecting records that represent different time periods, data sources, or other relevant characteristics. It could also prioritize records with more complete information or those that have been more recently updated. Another approach could involve clustering the records within the large CK group and selecting representatives from each cluster. The goal is to retain a diverse subset that captures the variability within the larger group while keeping the computational requirements manageable.

Following the group size check, the method proceeds to step 410, where it computes pairwise distances between some or all of the records in the group. This computation can involve various distance metrics depending on the nature of the data. For categorical data, methods like Hamming distance might be used, while for numerical data, Euclidean or Manhattan distances could be appropriate. For text fields, techniques such as cosine similarity or Levenshtein distance might be employed. The method calculates these distances for each pair of records within the group.

In some implementations, this step can identify potential outliers within the CK group. Specifically, any record pairs having a distance greater than, for example, an average distance by a distance threshold may be considered outliers. The method first calculates the average pairwise distance within the group. Then, it identifies pairs where the distance exceeds this average by a predetermined threshold (e.g., 2 standard deviations). Records that consistently appear in these high-distance pairs are flagged as potential outliers. This approach helps identify records that, despite sharing a CK, may not truly belong to the same entity, thus improving the quality of the training data by reducing false positives in the matching process.

At step 412, the method identifies outliers based on the computed pairwise distances. In some implementations, this step can be used to address the over-clustering problem that can occur with shared CKs. Specifically, CKs can often act as a proxy for identity and thus tend to over cluster. For example, loyalty programs, frequent flyer IDs, credit card IDs, etc. tend to be shared in a household shared across multiple people and thus naturally over-cluster.

The illustrated figure, which utilizes a threshold in step 404 of determines next, in step 412, whether there are zero or more (M) outliers. First, if no outliers were detected in step 410 and step 412, the method moves to step 414, where all records in the group are used. If, however, more than zero outliers were detected, the method may proceed proceeds to step 416, implementing a leave-M-out process. In some implementations, the value of M may be tunable. For example, the method may set a maximum of two outliers (M=2) to be removed from the group. In this case, if one outlier is found it would be removed, if two outliers were found both would be removed, and if more than two outliers were identified only the two most outlying (or other criteria) outliers would be removed. In some implementations, if more than M outliers are detected, the method may alternative halt or otherwise raise an error for a cluster to be re-examined as exceeding the threshold may indicate a potential issue with the clustering.

Next, in step 418, the method can remove the identified outlier(s) from the CK group. In some implementations, the method can permanently remove the outliers or soft-delete the outliers from the group.

In step 420, after handling any outliers (or if no outliers were found), the method can include generating N-squared pairs from the remaining records in the group. This step creates all possible pairs of records within the CK group, which will be used for training the entity matching classifier. Since the CK group is associated with a single user, the N-squared pairs can thus represent positive training examples of matching records.

In step 422, the method can include adding the generated pairs to a training set. These pairs, having been filtered for outliers, represent a more accurate set of potential matches within the CK group. These matching records can be used as the input to FIG. 3. Next, the method then checks if there are more CK groups to process in step 424. If so, the process returns to step 404 to begin processing the next CK group. If no more CK groups remain, the method can terminate.

The above filtering method for shared CKs addresses a technical issue in using client-provided identifiers for entity matching. Specifically, in many real-world scenarios there are many records that have the same CK where a majority of the records are associated the same user. However, in many instances, a smaller number of records are associated with another user (e.g., a partner, child, etc.). By implementing this filtering process, the method significantly improves the quality of the training data as it reduces the risk of false positives that could arise from shared CKs within households or families. This, in turn, enhances the accuracy of the entity matching classifier by providing it with a more refined set of training examples.

The method's approach of limiting group sizes, computing pairwise distances, and selectively removing outliers represents a technical solution to the over-clustering problem. It strikes a balance between leveraging the valuable information provided by CKs and mitigating the potential errors that could arise from blindly trusting these keys. Furthermore, this filtering method aligns with the overall goal of creating a high-quality, balanced training dataset. By carefully curating the record pairs generated from CK groups, it ensures that the training data more accurately reflects true entity matches, rather than incidental associations due to shared identifiers.

Figure 5:
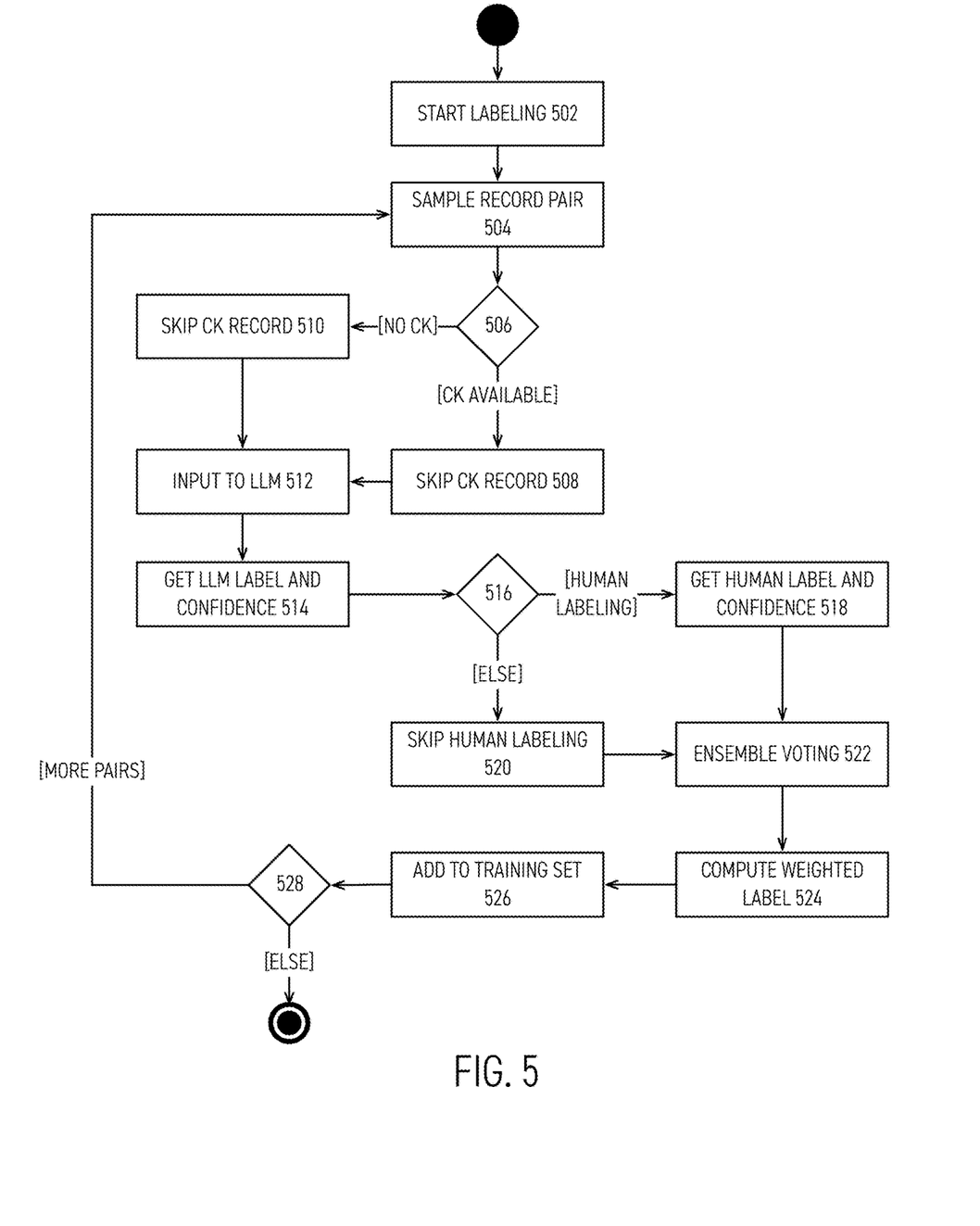
FIG. 5 is a flow diagram illustrating a method for integrating Large Language Models (LLMs) and implementing ensemble voting in the process of generating training data for an entity matching classifier according to some embodiments of the disclosure.

FIG. 5 is a flow diagram illustrating a method for integrating Large Language Models (LLMs) and implementing ensemble voting in the process of generating training data for an entity matching classifier according to some embodiments of the disclosure.

In step 502, the method initiates a labeling method.

In some implementations, this labeling method typically begins after the initial sampling and filtering of record pairs have been completed. It can start when there is a need to assign match or non-match labels to the selected record pairs for inclusion in the training dataset. The labeling method may be initiated as part of the regular workflow for updating or expanding the training data, especially when new data sources are introduced or when the existing model's performance indicates a need for retraining. It can also be triggered when there's a desire to incorporate new labeling sources, such as large language models or updated client key systems, into the entity matching process. The method represents a significant advancement in automating and improving the quality of labels for training data in entity matching, as will be discussed herein.

In step 504, the method samples a record pair. In this step, the method can select a pair of records that will be evaluated for potential matching. The sampling process may utilize techniques described in previous figures to ensure a diverse and representative set of record pairs.

In step 506, the method can include checking if a CK is available for the sampled record pair. This decision point can be used to determine whether the method can leverage client-provided identifiers in the labeling process.

If a CK is available, the method proceeds to step 508, where it obtains a CK label. In some implementations, the method can use the CK as a preliminary source of labels for the training data. When the method obtains a CK label in step 508, the method can include using the presence of matching CKs between two records as an initial indicator of a potential match. This labeling based on CKs is separate from and precedes the actual classification process described previously. In some implementations, the CK serves as a heuristic for creating labeled training data, which will later be used to train or fine-tune the ordinal regression classifier. In some implementations, the CK label is considered a strong indicator because it's derived from the client's own identification system, which often incorporates various pieces of personally identifiable information (PII) such as emails, phone numbers, and addresses. However, it is not infallible because there can be cases where a shared CK doesn't necessarily mean the records refer to the same entity, which is why additional steps and checks are incorporated into the overall process. If no CK is available, the method moves to step 510, where it skips the CK label. This ensures that the process can continue even in the absence of client-provided identifiers.

In step 512, regardless of whether a CK label was obtained, the method can include inputting the record pair to a Large Language Model (LLM) and, in step 514, the method obtains a label and confidence score from the LLM.

In some implementations, this step can include generating a prompt that presents the record pair information in a structured format and asking the LLM to determine if the records likely refer to the same entity. The prompt may include specific instructions on how to compare different fields (e.g., names, addresses, phone numbers) and how to handle partial matches or missing data. The LLM is typically asked to provide not just a binary match/non-match decision, but also a confidence score (e.g., on a scale of 0-100) and a brief explanation for its decision. This confidence score is used for weighting the LLM's input in the ensemble voting process, as will be discussed. The method may use techniques like few-shot learning, where example pairs with known match status are included in the prompt to guide the LLM's decision-making process. Additionally, the prompt engineering process may involve iterative refinement based on the LLM's performance on a validation set, adjusting the prompt to improve accuracy and consistency in entity matching tasks. This LLM-based labeling provides an additional, potentially more nuanced perspective on the matching likelihood of the record pair.

In step 516, the method can optionally include checking if human labeling is available. This step allows for the integration of human expertise in cases where it's available and deemed necessary. If human labeling is available, the method proceeds to step 518, where it obtains a human label and confidence score. In some implementations, this step may involve organizing structured labeling sessions where a group of trained individuals manually review and label selected record pairs. The selection of pairs for human labeling can be strategically focused on ambiguous or complex cases that may be challenging for automated methods. This human input can provide valuable insights and serve as a high-quality reference point, particularly for edge cases or scenarios where automated labeling methods may have lower confidence. The human labeling process can be designed to capture not only binary match/non-match decisions but also confidence levels and rationales, which can be incorporated into the overall labeling and training process. If human labeling is not available, the method moves to step 520, where it skips the human label.

In step 522, the method performs ensemble voting.

In this step, the method can combine the labels and confidence scores from the available sources (CK, LLM, and optionally human) to produce a final label. In some implementations, the ensemble voting process can employ a weighted average approach, where each labeling source is assigned a weight based on its perceived reliability and the confidence of its prediction. For instance, CK matches might be given a high base weight due to their strong correlation with true matches, but this weight could be adjusted based on the CK quality score determined earlier in the process. The LLM's input might be weighted according to its confidence score, with higher confidence predictions carrying more influence. Human labels, when available, could be given substantial weight, especially for ambiguous cases where expert judgment is valuable. The method may also incorporate a threshold system, where unanimous or near-unanimous decisions across sources are automatically accepted, while conflicting labels trigger a more nuanced decision process. This ensemble approach allows the method to leverage the strengths of each labeling source while mitigating their individual weaknesses, potentially leading to more robust and accurate final labels for the training dataset.

In step 524, the method can include computing a weighted label.

In some implementations, this step takes into account the relative reliability and confidence of each labeling source. In some implementations, the method may employ a multi-tiered weighting system. Initially, a quality threshold is applied to each labeling source, ensuring that only sources meeting a minimum reliability standard are considered in the weighting process. For instance, only CK systems with a quality score above a predetermined threshold might be included. Once the qualifying sources are identified, their respective quality scores or confidence levels are utilized as weights in the ensemble calculation. This approach allows the method to dynamically adjust the influence of each labeling source based on its demonstrated reliability, potentially leading to more accurate final labels. The weighted calculation might involve normalizing these scores across all included sources and then computing a weighted average of their label predictions, resulting in a final, nuanced label that reflects the collective input of multiple, quality-vetted labeling mechanisms.

In step 526, the computed label is added to the training set. This labeled record pair becomes part of the dataset used to train the entity matching classifier. The method then checks if there are more pairs to process in step 528. If yes, the method returns to step 504 to sample the next record pair. If no more pairs remain, the method may terminate.

The above method represents a technical advancement in generating high-quality labels for entity matching. By combining multiple sources of information (e.g., client keys, large language models, and when available, human expertise) it creates a more robust and nuanced labeling process. Further, the ensemble voting approach allows the system to balance different sources of information. It can account for the strengths and weaknesses of each labeling method, potentially leading to more accurate overall labels. The method's flexibility allows it to adapt to different scenarios. Specifically, it can function with or without CKs, and with or without human labeling, making it versatile across various data environments and resource constraints. The weighted label computation step also can ensure that the final labels take into account the confidence and reliability of each input. This nuanced approach can capture subtleties in the matching likelihood that might be missed by simpler labeling methods.

Figure 6:
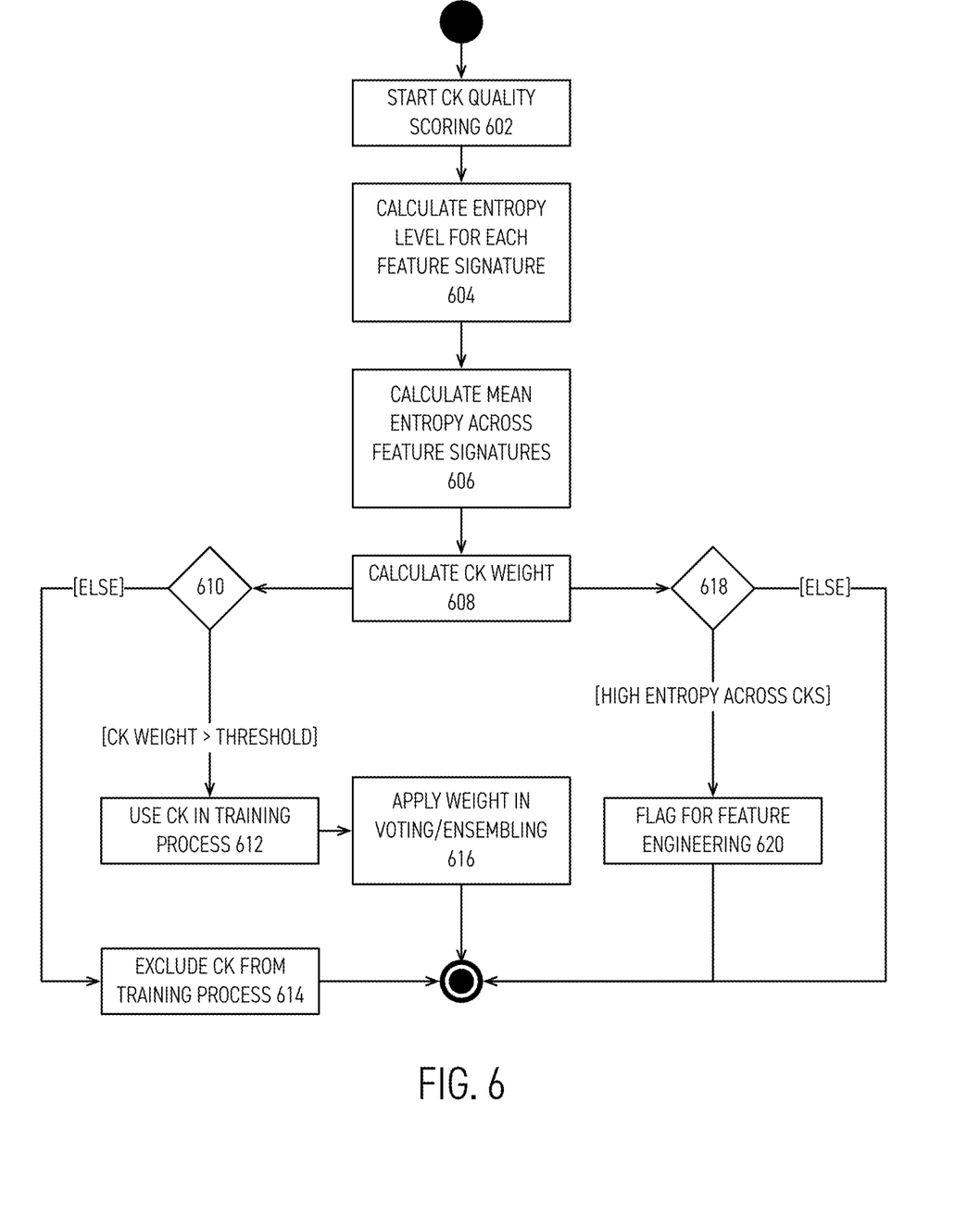
FIG. 6 is a flow diagram illustrating a method for assessing the quality of client keys and applying this assessment in the entity matching process, according to some embodiments of the disclosure.

FIG. 6 is a flow diagram illustrating a method for assessing the quality of client keys and applying this assessment in the entity matching process, according to some embodiments of the disclosure.

In step 602, the method can include initiating a CK quality score process.

This method typically begins as part of the initial data preparation phase or during periodic system evaluations. It can be triggered when new client data is ingested into the system, when there are significant updates to existing client data, or as part of a scheduled maintenance routine. The CK quality score process can also be initiated when performance metrics of the entity matching system indicate a potential decline in accuracy, suggesting a need to reassess the reliability of the CK systems in use. Additionally, this process might start when new CK systems are introduced or when there are changes in the data landscape that could affect the consistency and reliability of existing CK systems. By regularly initiating this process, the method ensures that the quality assessment of CK systems remains current, allowing for dynamic adjustments in how these systems are weighted and utilized in the overall entity matching framework.

In step 604, the method can calculate entropy for each feature signature associated with the CK. Entropy in this context can serve as a measure of the information content and consistency of the CK system. In some implementations, the CK quality score process is designed to evaluate multiple CK systems across various tenants. The method can identify CK systems that exhibit optimal characteristics for entity matching. Specifically, it assesses which CK systems correlate with record pairs that demonstrate an appropriate level of information density. The method can then favor CK systems that produce record pairs that are neither too sparse in matching information nor overly similar.

In step 606, the method can include calculating the mean entropy across all feature signatures for the CK.

In step 608, the method can include calculating the CK weight. This calculation can include aggregating the entropy values computed for each feature signature associated with the given CK system and determining their average. The feature signatures typically represent various combinations of attributes or characteristics of record pairs that share the same CK. By calculating the mean entropy, the method provides a single, comprehensive measure of the overall consistency and information content of the CK system. A lower mean entropy generally indicates that the CK system is more consistent in how it groups records, potentially signifying a more reliable identifier for entity matching purposes. Conversely, a higher mean entropy suggests greater variability or uncertainty in the record groupings associated with the CK, which may indicate a less reliable system for entity matching tasks.

In some implementations, the CK weight can be computed as one minus the mean entropy. In some implementations, the method employs an automated approach to sampling and labeling, reducing or eliminating the need for manual human intervention. This automated process leverages the entropy-based quality assessment of CK systems. The weighting mechanism is designed to assign greater importance to CK systems exhibiting lower entropy values. The underlying principle is that lower entropy in a CK system typically correlates with higher consistency and reliability in entity matching contexts. By prioritizing low-entropy CK systems, the method aims to enhance the accuracy and efficiency of the automated sampling and labeling processes. This approach can potentially improve the overall quality of the training data while minimizing the resource-intensive and potentially error-prone aspects of manual data preparation for entity matching tasks.

In step 610, the method can include checking if the calculated CK weight is above a predetermined threshold. If the CK weight is above the threshold, the method moves to step 612, where it can use the CK in the training process. If the CK weight is below the threshold, the method can proceed to step 614, where it can exclude the CK from the training process. These steps can be used to ensure that only reliable CK systems influence the entity matching model.

For CKs that pass the threshold, the method can apply a calculated weight in the voting/ensembling process (described above) in step 616. This weighted approach allows the system to leverage the most reliable CK systems more heavily in the final decision-making process. Independently of whether a CK is used or excluded, the method can perform another check at step 618 to determine if there is high entropy across CKs for a particular feature signature. This step can be used to identify potential areas for improvement in the feature engineering process. If high entropy is detected across CKs for a feature signature, the method flags this feature for engineering at step 620. In general, if certain feature signatures consistently show high entropy across all client systems, it indicates the necessity for additional features or more detailed granularity, pointing to an opportunity for further feature engineering.

The above method addresses several technical challenges in using client-provided identifiers for entity matching. First, it provides a systematic way to evaluate the quality of different CK systems, allowing the entity matching process to rely more heavily on the most consistent and informative identifiers. Second, the use of entropy as a quality metric is particularly innovative. In general, higher entropy may correlate with greater uncertainty, so the method can assign lower weights to client systems with high entropy. This approach allows the system to automatically adapt to varying levels of CK quality across different clients or data sources. In some implementations, the method's ability to flag features for engineering based on consistently high entropy is another significant technical advantage. This feature allows for continuous improvement of the entity matching system, identifying areas where additional or more granular features could improve performance. Furthermore, the weighting system used in the method allows for more nuanced use of CKs in the overall entity matching process. Rather than treating all CKs as equally reliable, the system can now adjust its reliance on different CK systems based on their demonstrated quality and consistency.

Figure 7:
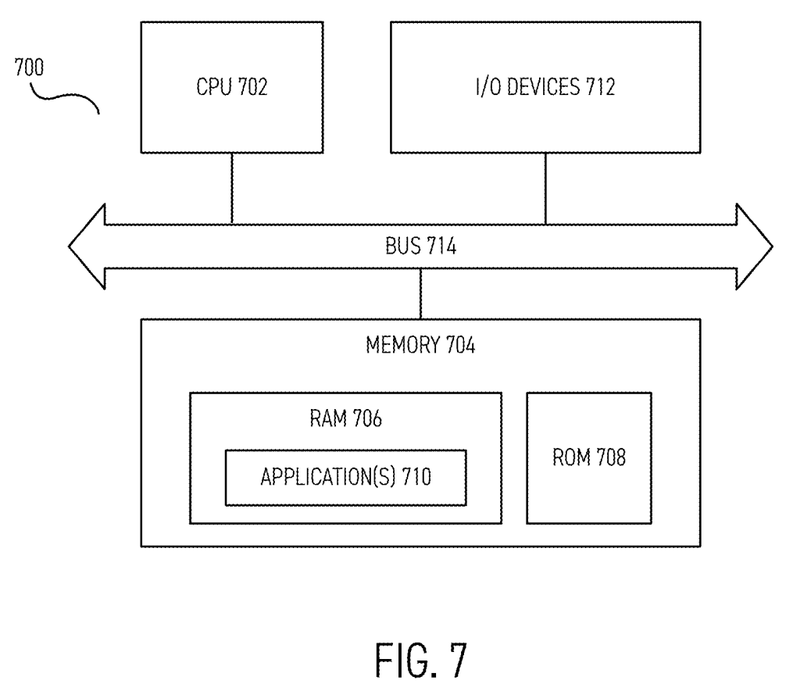
FIG. 7 is a block diagram of a computing device according to some embodiments of the disclosure.

FIG. 7 is a block diagram of a computing device according to some embodiments of the disclosure.

As illustrated, the device 700 includes a processor or central processing unit (CPU) such as CPU 702 in communication with a memory 704 via a bus 714. The device also includes one or more input/output (I/O) or peripheral devices 712. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 702 may comprise a general-purpose CPU. The CPU 702 may comprise a single-core or multiple-core CPU. The CPU 702 may comprise a system-on-a-chip (SoC) or a similar embedded system. In some embodiments, a graphics processing unit (GPU) may be used in place of, or in combination with, a CPU 702. Memory 704 may comprise a memory system including a dynamic random-access memory (DRAM), static random-access memory (SRAM), Flash (e.g., NAND Flash), or combinations thereof. In one embodiment, the bus 714 may comprise a Peripheral Component Interconnect Express (PCIe) bus. In some embodiments, the bus 714 may comprise multiple busses instead of a single bus.

Memory 704 illustrates an example of a non-transitory computer storage media for the storage of information such as computer-readable instructions, data structures, program modules, or other data. Memory 704 can store a basic input/output system (BIOS) in read-only memory (ROM), such as ROM 708 for controlling the low-level operation of the device. The memory can also store an operating system in random-access memory (RAM) for controlling the operation of the device.

Applications 710 may include computer-executable instructions which, when executed by the device, perform any of the methods (or portions of the methods) described previously in the description of the preceding figures. In some embodiments, the software or programs implementing the method embodiments can be read from a hard disk drive (not illustrated) and temporarily stored in RAM 706 by CPU 702. CPU 702 may then read the software or data from RAM 706, process them, and store them in RAM 706 again.

The device may optionally communicate with a base station (not shown) or directly with another computing device. One or more network interfaces in peripheral devices 712 are sometimes referred to as a transceiver, transceiving device, or network interface card (NIC).

An audio interface in peripheral devices 712 produces and receives audio signals such as the sound of a human voice. For example, an audio interface may be coupled to a speaker and microphone (not shown) to enable telecommunication with others or generate an audio acknowledgment for some action. Displays in peripheral devices 712 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 712 may comprise any input device arranged to receive input from a user. An illuminator in peripheral devices 712 may provide a status indication or provide light. The device can also comprise an input/output interface in peripheral devices 712 for communication with external devices, using communication technologies, such as USB, infrared, Bluetooth®, or the like. A haptic interface in peripheral devices 712 provides tactile feedback to a user of the client device.

A GPS receiver in peripheral devices 712 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device may include more or fewer components than those shown, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The preceding detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and," "or," or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur out of the order noted in the operational illustrations. For example, two blocks shown in succession can in fact be executed substantially concurrently or the blocks can sometimes be executed in the reverse order, depending upon the functionality or acts involved.

We claim:

1. A method for generating training data for an entity matching classifier, the method comprising:
   receiving a set of client-provided data, the set of client-provided data including records with client keys;
   concatenating the set of client-provided data and grouping records by client keys to generate grouped records;
   generating pairwise features for record pairs in the grouped records;
   generating inferred labels for the record pairs based on their corresponding client keys;
   performing an aggregate voting process on feature signatures across multiple clients to determine match levels;
   generating a training dataset based on the feature signatures and determined match levels;
   training a classifier using the training dataset, wherein the classifier comprises an ordinal, regression-based classifier; and
   applying the trained classifier to new client data to merge database records identified as matching entities, the merging comprising removing original data records and inserting a new database record.

2. The method of claim 1, wherein generating inferred labels comprises:
   assigning a match label and a value of one to record pairs with matching client keys;
   assigning a non-match label and a value of zero to record pairs with conflicting client keys; and
   assigning an unknown label and a null value to record pairs where at least one record has a null client key.

3. The method of claim 1, wherein performing aggregate voting comprises:
   computing a match rate for each feature signature for each client;
   calculating an average match rate across all clients for each feature signature; and
   assigning a match level to each feature signature based on the average match rate and predefined thresholds.

4. The method of claim 1, further comprising:
   computing entropy-based weights for client key systems; and
   applying the entropy-based weights to refine the aggregate voting process, wherein the entropy-based weights are calculated as a function of entropies of feature signatures associated with each client key system.

5. The method of claim 1, further comprising: sampling record pairs based on client key matches; creating artificial non-matches by pairing records from different client key matches; and filtering the client key matches and artificial non-matches based on density and similarity checks.

6. The method of claim 1, further comprising: for each group of records sharing a client key: limiting a group size to a predetermined maximum; identifying and removing outlier records based on pairwise comparison distances; and generating pairwise record pairs from remaining records for inclusion in the training dataset.

7. The method of claim 1, wherein generating inferred labels comprises: obtaining labels from multiple sources including client keys and large language models; assigning confidence scores to labels from each source; and computing a weighted label using ensemble voting based on the labels and confidence scores from the multiple sources.

8. The method of claim 1, further comprising: calculating an entropy-based quality score for each client key system; weighting each client key system in the aggregate voting process based on its quality score; and flagging feature signatures with consistently high entropy across client key systems for further feature engineering.

9. A non-transitory computer-readable storage medium for tangibly storing computer program instructions capable of being executed by a computer processor, the computer program instructions defining steps of:
   receiving a set of client-provided data, the set of client-provided data including records with client keys;
   concatenating the set of client-provided data and grouping records by client keys to generate grouped records;
   generating pairwise features for record pairs in the grouped records;
   generating inferred labels for the record pairs based on their corresponding client keys;
   performing an aggregate voting process on feature signatures across multiple clients to determine match levels;
   generating a training dataset based on the feature signatures and determined match levels;
   training a classifier using the training dataset, wherein the classifier comprises an ordinal, regression-based classifier; and
   applying the trained classifier to new client data to merge database records identified as matching entities, the merging comprising removing original data records and inserting a new database record.

10. The non-transitory computer-readable storage medium of claim 9, wherein generating inferred labels comprises:
   assigning a match label and a value of one to record pairs with matching client keys;
   assigning a non-match label and a value of zero to record pairs with conflicting client keys; and
   assigning an unknown label and a null value to record pairs where at least one record has a null client key.

11. The non-transitory computer-readable storage medium of claim 9, wherein performing aggregate voting comprises:
   computing a match rate for each feature signature for each client;
   calculating an average match rate across all clients for each feature signature; and
   assigning a match level to each feature signature based on the average match rate and predefined thresholds.

12. The non-transitory computer-readable storage medium of claim 9, further comprising:

computing entropy-based weights for client key systems; and applying the entropy-based weights to refine the aggregate voting process, wherein the entropy-based weights are calculated as a function of entropies of feature signatures associated with each client key system.

13. The non-transitory computer-readable storage medium of claim 9, the steps further comprising: sampling record pairs based on client key matches; creating artificial non-matches by pairing records from different client key matches; and filtering the client key matches and artificial non-matches based on density and similarity checks.

14. The non-transitory computer-readable storage medium of claim 9, the steps further comprising: for each group of records sharing a client key: limiting a group size to a predetermined maximum; identifying and removing outlier records based on pairwise comparison distances; and generating pairwise record pairs from remaining records for inclusion in the training dataset.

15. The non-transitory computer-readable storage medium of claim 9, wherein generating inferred labels comprises: obtaining labels from multiple sources including client keys and large language models; assigning confidence scores to labels from each source; and computing a weighted label using ensemble voting based on the labels and confidence scores from the multiple sources.

16. The non-transitory computer-readable storage medium of claim 9, the steps further comprising: calculating an entropy-based quality score for each client key system; weighting each client key system in the aggregate voting process based on its quality score; and flagging feature signatures with consistently high entropy across client key systems for further feature engineering.

17. A device comprising:
a processor;
a storage medium for tangibly storing thereon program logic for execution by the processor, the program logic comprising steps for:
  receiving a set of client-provided data, the set of client-provided data including records with client keys;
  concatenating the set of client-provided data and grouping records by client keys to generate grouped records;
  generating pairwise features for record pairs in the grouped records;
  generating inferred labels for the record pairs based on their corresponding client keys;
  performing an aggregate voting process on feature signatures across multiple clients to determine match levels;
  generating a training dataset based on the feature signatures and determined match levels;
  training a classifier using the training dataset, wherein the classifier comprises an ordinal, regression-based classifier; and
  applying the trained classifier to new client data to merge database records identified as matching entities, the merging comprising removing original data records and inserting a new database record.

18. The device of claim 17, the steps further comprising: sampling record pairs based on client key matches; creating artificial non-matches by pairing records from different client key matches; and filtering the client key matches and artificial non-matches based on density and similarity checks.

19. The device of claim 17, the steps further comprising: for each group of records sharing a client key: limiting a group size to a predetermined maximum; identifying and removing outlier records based on pairwise comparison distances; and generating pairwise record pairs from remaining records for inclusion in the training dataset.

20. The device of claim 17, wherein generating inferred labels comprises: obtaining labels from multiple sources including client keys and large language models; assigning confidence scores to labels from each source; and computing a weighted label using ensemble voting based on the labels and confidence scores from the multiple sources.

* * * * *